US009980092B1

(12) United States Patent
Wirola et al.

(10) Patent No.: US 9,980,092 B1
(45) Date of Patent: May 22, 2018

(54) SUPPORTING A SURVEILLANCE OF POSITIONS OF DEVICES

(71) Applicant: HERE Global B.V., Eindhoven (NL)

(72) Inventors: Lauri Aarne Johannes Wirola, Tampere (FI); Kalle Asikainen, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days. days.

(21) Appl. No.: 15/420,312

(22) Filed: Jan. 31, 2017

(51) Int. Cl.
*H04W 4/02* (2018.01)
*H04W 4/00* (2018.01)
*H04W 64/00* (2009.01)
*H04W 84/18* (2009.01)
*H04W 88/02* (2009.01)

(52) U.S. Cl.
CPC ........... *H04W 4/023* (2013.01); *H04W 4/008* (2013.01); *H04W 64/003* (2013.01); *H04W 84/18* (2013.01); *H04W 88/02* (2013.01)

(58) Field of Classification Search
CPC .. H04W 84/18; H04W 28/12; H04M 2250/12
USPC ................ 455/456.1; 370/254, 406
See application file for complete search history.

(56) References Cited

U.S. PATENT DOCUMENTS

| 8,026,814 | B1 | 9/2011 | Heinze et al. |
| 2005/0136972 | A1 | 6/2005 | Smith et al. |
| 2005/0171876 | A1 | 8/2005 | Golden |
| 2011/0030875 | A1 | 2/2011 | Conte et al. |
| 2015/0247916 | A1 | 9/2015 | Bartov et al. |

OTHER PUBLICATIONS

Janire Larranaga; et al, "An Environment Adaptive ZigBee-based Indoor Positioning Algorithm", 2010 International Conference on Indoor Positioning and Indoor Navigation, pp. 1-8.
R. Mardeni; et al., "Efficient Mobile Asset Tracking and Localization in Zigbee Wireless Network", Journal of Advances in Computer Networks, vol. 3, No. 1, Mar. 2015, pp. 1-6.
Redpoint Positioning, "SafetyNet™—Wireless Work SiteInfrastructure for Real-Time Trackingand Communication" Oct. 20, 2016, pp. 1-5.

*Primary Examiner* — Sam Bhattacharya
(74) *Attorney, Agent, or Firm* — Lempia Summerfield Katz LLC

(57) ABSTRACT

Each of a plurality of transmitters, which are distributed at fixed locations of a site, regularly transmits radio signals. A mesh node performs measurements on radio signals transmitted by at least one transmitter and transmits messages including results of the measurements. The mesh node belongs to a plurality of mesh nodes, each configured to monitor at least one environmental parameter at the site. A gateway node receives messages transmitted by the mesh node directly and/or via at least one other mesh node of the plurality of mesh nodes, wherein each of the plurality of mesh nodes is configured to receive messages from other mesh nodes of the plurality of mesh nodes and to forward received messages. The gateway node transmits received messages to a server that is configured to monitor mesh nodes at the site based on results of measurements.

17 Claims, 7 Drawing Sheets

SUPPORTING A SURVEILLANCE OF POSITIONS OF DEVICES

FIELD OF THE DISCLOSURE

The disclosure relates to the field of positioning and more specifically to supporting a surveillance of positions of devices at a particular site.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate positioning outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage. In the training stage, learning data is collected. The data may be collected in the form of fingerprints that are based on measurements by mobile devices. A fingerprint may contain a location estimate and measurements taken from a radio interface. The location estimate may be for example GNSS based, sensor-based, or manually inputted. Results of measurements taken from the radio interface may comprise, by way of example, measured radio signal strengths and an identification of WLAN access points transmitting the radio signals. Collected fingerprint data may be uploaded to a database in a server or in the cloud, where algorithms may be run to generate radio models of WLAN access points and/or radio maps for positioning purposes. In the positioning stage, the current location of a mobile device may be estimated based on measurements of the mobile device taken from the radio interface and on the data or a subset of data that is available from the training stage.

A similar approach could be used for a positioning that is based on other types of terrestrial transmitters or on a combination of different types of terrestrial transmitters.

A model or radio map based positioning may function either in mobile-based or mobile-assisted mode, the difference being in where the position estimate is calculated. For the mobile-based approach, model data or radio map data that has been generated in the training stage may be transferred to mobile devices by a server as assistance data for use in position determinations. This may be useful for instance for mobile phones, where primarily the mobile device's user is interested in location information. The mobile-assisted mode, in contrast, refers to the case in which the device only makes the appropriate measurements, for e.g. signal strength measurements, and sends the measurement results to another entity, e.g. a server, for position estimation.

SUMMARY OF SOME EMBODIMENTS OF THE INVENTION

A method is described, which comprises each of a plurality of transmitters, which are distributed at fixed locations of a site, transmitting radio signals in regular intervals. The method further comprises at least one mesh node performing measurements on radio signals transmitted by at least one transmitter of the plurality of transmitters and transmitting messages including results of the measurements, wherein the at least one mesh node belongs to a plurality of mesh nodes, with each of the plurality of mesh nodes configured to monitor at least one environmental parameter at the site. The method further comprises at least one gateway node receiving messages transmitted by the at least one mesh node directly and/or via at least one other mesh node of the plurality of mesh nodes, wherein each of the plurality of mesh nodes is configured to receive messages from other mesh nodes of the plurality of mesh nodes and to forward received messages. The method further comprises the at least one gateway node transmitting received messages of the at least one mesh node to a server that is configured to monitor mesh nodes at the site based on results of measurements in received messages.

Moreover, a first system is described, which comprises means for causing the system to perform the actions of any presented embodiment of the described method.

The means of this system can be implemented in hardware and/or software. They may comprise for instance processors for executing computer program code for realizing the required functions, memories storing the program code, or both. Alternatively, they could comprise for instance circuitries that are designed to realize the required functions, for instance implemented in chipsets or chips, like integrated circuits. In one embodiment, the means of the described first system are processing means.

Moreover, a second system is described, which comprises a plurality of transmitters distributed at fixed locations of a site, each configured to transmit radio signals in regular intervals. The system further comprises a plurality of mesh nodes, each of the plurality of mesh nodes configured to monitor at least one environmental parameter at the site, and each of the plurality of mesh nodes configured to receive messages from other mesh nodes of the plurality of mesh nodes and to forward received messages. At least one of the plurality of mesh nodes is moreover configured to perform measurements on radio signals transmitted by at least one transmitter of the plurality of transmitters and to transmit messages including results of the measurements. The system further comprises at least one gateway node configured to receive messages transmitted by the at least one mesh node directly and/or via at least one other mesh node of the plurality of mesh nodes and configured to transmit received messages of the at least one mesh node to a server that is configured to monitor mesh nodes at the site based on results of measurements in received messages.

Moreover, at least one non-transitory computer readable storage medium is described, in which computer program code is stored. The computer program code causes a system to perform the actions of any presented embodiment of the described method when executed by processors.

Each computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the disclosure.

In certain embodiments of the described methods, the methods are methods for supporting a surveillance of devices at a site. In certain embodiments of the described system, the system is a system for supporting a surveillance of devices at a site. In certain embodiments of the described apparatus, the apparatus is an apparatus for supporting a surveillance of devices at a site.

It is to be understood that any feature presented for a particular exemplary embodiment may also be used in an analog manner in combination with any other described exemplary embodiment of any category.

Further, it is to be understood that the presentation of the disclosure in this section is merely exemplary and non-limiting.

Other features of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not drawn to scale and that they are merely intended to conceptually illustrate the structures and procedures described herein.

DETAILED DESCRIPTION OF THE FIGS

Figure 1:
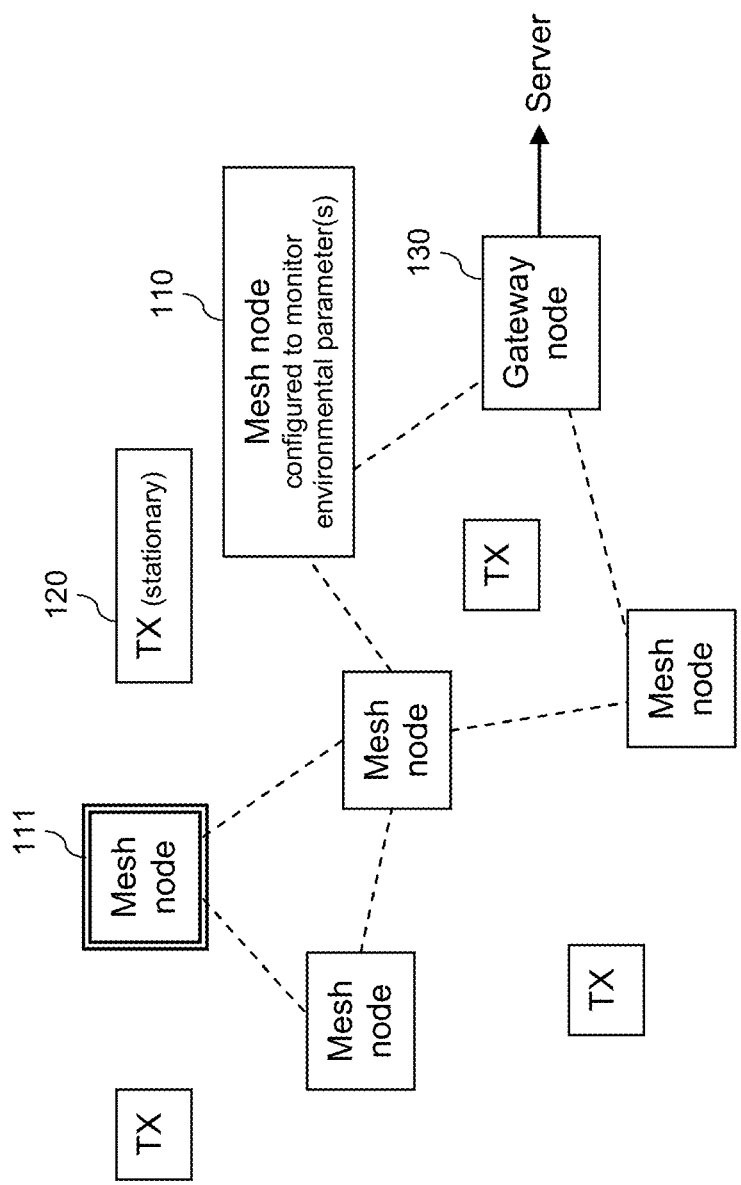
FIG. 1 is a schematic block diagram of an example embodiment of a system according to the disclosure.

FIG. 1 is a schematic block diagram of an example embodiment of a system according to the disclosure. The system may be arranged at any kind of site, for instance a factory or laboratory. The site may comprise indoor and/or outdoor areas.

The system comprises a plurality of mesh nodes 110, a plurality of transmitters (TX) 120 and at least one gateway node 130. The mesh nodes 110 may be assigned to particular locations of the site, or they may be designed for frequent rearrangement. They may be configured to operate when stationary, or they may be configured to be operable as well while being moved around. The transmitters 120 are distributed to fixed locations at the site, and each of the transmitters 120 is configured to broadcast radio signals in regular intervals. Each of the mesh nodes 110 is configured to receive messages from other mesh nodes 110 and to broadcast the received messages. Among the mesh nodes 110, at least one mesh node 111 is moreover configured to perform measurements on radio signals broadcast by the transmitters 120. The at least one gateway node 130 is configured receive messages from any of the mesh nodes 110 and to forward received messages to a server. The server may or may not be considered a part of the system and it may or may not be located at the site. It may even be located at some completely different physical place, including the cloud. Any of the transmitters 120 may be a transmitter only or a part of a transceiver. Furthermore, any of the transmitters 120 may or may be a part of a mesh node 110 of the plurality of mesh nodes or belong to a separate entity. If the transmitters 120 are part of at least some of the mesh nodes 110, these at least some mesh nodes 110 are distributed to fixed locations at the site.

An operation in the system of FIG. 1 will now be described with reference to the flow chart of FIG. 2. The operation is an example embodiment of a method according to the disclosure.

Each of a plurality of transmitters 120, which are distributed to fixed locations of a site, transmits radio signals in regular intervals. (action 210) The transmitters 120 are thus able to generate a static radio field at the site.

At least one mesh node 111 performs measurements on radio signals transmitted by at least one transmitter 120 of the plurality of transmitters 120. The at least one mesh node 111 belongs to a plurality of mesh nodes 110, with each of the plurality of mesh nodes 110 configured to monitor at least one environmental parameter at the site. (action 220) The at least one environmental parameter may comprise for instance temperature, humidity and/or the presence of dangerous gases, etc. The measurements may be performed for instance regularly or continuously or be triggered by a predetermined criterion. Such a criterion may be for instance a change of location detected by at an optional motion sensor, like an accelerometer, of the mesh node or a detected change of value of the at least one environmental parameter monitored by the mesh node.

The at least one mesh node 111 moreover transmits messages including results of the measurements. (action 221) If measurements are performed continuously or on a regular basis, messages including results of measurements may be transmitted for instance on a regular basis. Alternatively, even if measurements are performed continuously or on a regular basis, messages including results of measurements may only be transmitted for instance in case a change compared to previous results of measurements is detected. Further alternatively, if the measurements are not performed continuously or on a regular basis, messages including results of measurements may be transmitted for instance whenever new measurements are available.

At least one gateway node 130 receives messages transmitted by the at least one mesh node 111 directly and/or via at least one other mesh node of the plurality of mesh nodes 110. Each of the plurality of mesh nodes 110 is configured to receive messages from other mesh nodes of the plurality of mesh nodes 110 and to forward received messages. (action 230) The mesh nodes thus form a wireless mesh—or wireless network—that enables a relaying of messages between the mesh nodes.

The at least one gateway node 130 transmits received messages of the at least one mesh node 111 to a server that is configured to monitor mesh nodes 110 at the site based on results of measurements in received messages. (action 231)

The disclosure is based on the consideration that at various types of sites, devices may be employed to monitor environmental parameters of the site. At such sites, a comprehensive cellular or WLAN coverage may not be given.

The disclosure is furthermore based on the consideration that one or more of these devices may be moved and/or deactivated, either in a planned manner or due to reasons unforeseen.

Certain embodiments of the disclosure therefore provide that devices that are configured to monitor environmental parameters of the site constitute at the same time mesh nodes. At least one of the mesh nodes is enabled to perform measurements on radio signals in the environment. If the radio signals are signals transmitted by transmitters that are arranged at fixed locations at the site, the results of the measurements allow drawing conclusions on the positions and/or operating states of one or more mesh nodes. The at least one mesh node is enabled to transmit a message containing the results of the measurements via a radio interface, so that it may be received by one or more of the other mesh nodes and/or by a gateway node. Each of the mesh nodes is enabled to forward a message with results of measurements. The gateway node may thus receive a message with results of measurements from the mesh node performing the measurements directly or via some other mesh nodes. The gateway node may forward the messages to a server, which may be configured to evaluate the measurement results in the messages to obtain desired information.

Certain embodiments of the disclosure may have the effect that monitoring the distribution of nodes may be supported in an efficient manner when using a mesh formed by the nodes themselves, which ensures that measurement results of any mesh node may reach a server via the mesh and a gateway node. Monitoring the position and/or the state of mesh nodes, which in turn monitor at least one environmental parameter, may ensure that values of environmental parameter are determined at the intended locations of a site. It is to be understood that the same mechanism of conveying a message from a mesh node to the server may efficiently be used as well for messages comprising alternatively or in addition other content, for instance content relating to the monitored environmental parameters.

Figure 2:
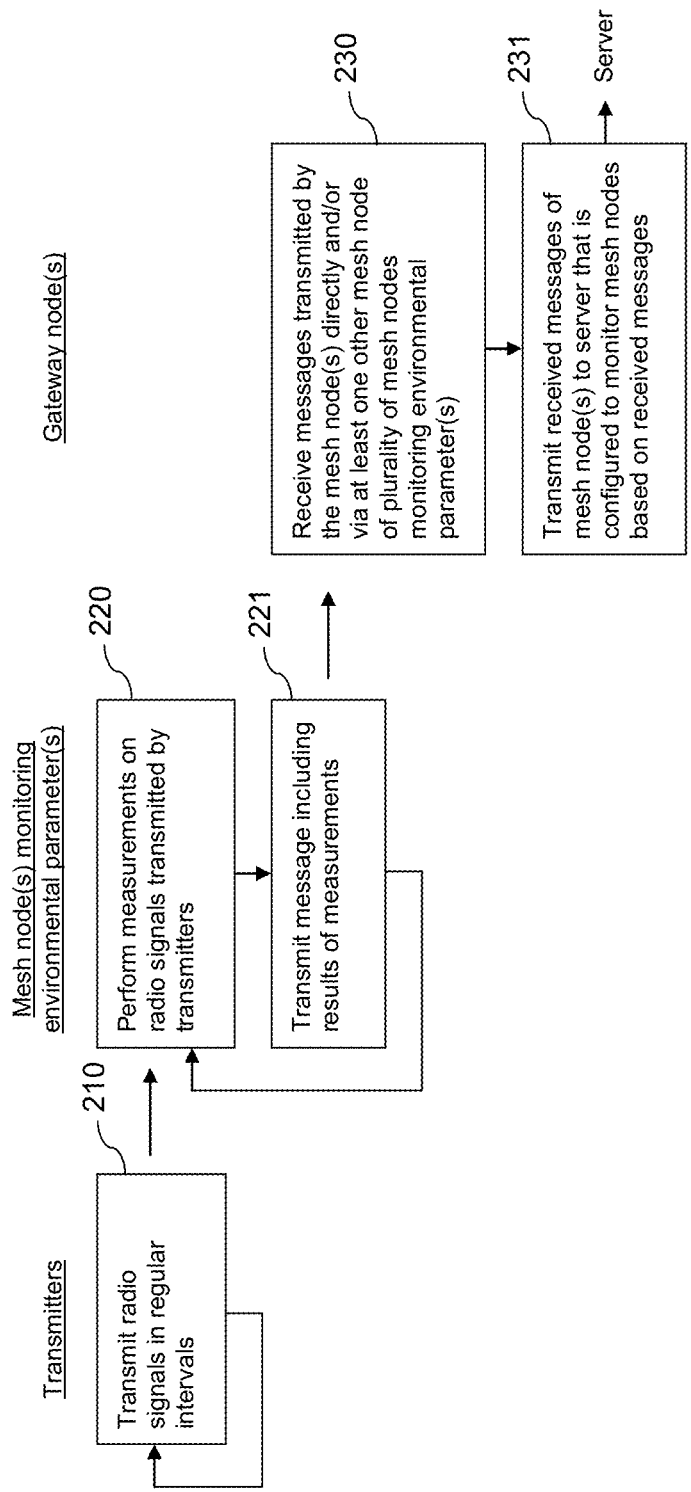
FIG. 2 is a flow chart illustrating an example operation in the system of FIG. 1.

Apparatus 100 illustrated in FIG. 1 and the method illustrated in FIG. 2 may be implemented and refined in various ways.

The mesh nodes and gateway node may not only be used for conveying messages including results of measurements on radio signals performed by mesh nodes. The same approach could be used for conveying messages including results of measurements on radio signals performed by other devices that are to be tracked at the site.

In certain embodiments, at least one device performs measurements on radio signals transmitted by at least one transmitter and broadcasts a message including results of the measurements, wherein the at least one device does not belong to the plurality of mesh nodes. At least one mesh node of the plurality of mesh nodes receives the message broadcast by the at least one device and forwards the received message, wherein each of the plurality of mesh nodes is configured to receive messages broadcast by the at least one device and to forward received messages of the at least one device. At least one gateway node receives the message broadcast by the at least one device via at least one mesh node of the plurality of mesh nodes. The at least one gateway node transmits the message broadcast by the at least one device to a positioning server that is configured to determine a position of the at least one device at the site. Determining the position of the device may be based on results of measurements in the message of the device. This may have the effect that a positioning of other devices than mesh nodes may be supported in the same manner and without any extra effort as the monitoring of mesh nodes.

The at least one device in this embodiment may be any device that is distinct from a mesh node. In particular, it may be any kind of asset device. Asset tracking may be relevant e.g. in factories. The assets to be tracked may be, for example, personnel or expensive equipment. An issue in factories or at other sites may be the lack of radio connectivity that is conventionally used for tracking a device. Cellular connectivity may be intermittent, and WLANs may be missing completely. Thus, the network established with the mesh nodes may be used as well for creating a data channel enabling other devices to report results of measurements on radio signals to a server. In an asset tracking use case, the asset itself does not need to be location-aware; rather, some entity or operator may have to know where the asset is located. The asset device itself may therefore not be required to have intelligence; it is only required to be configured to take measurements and to send them forward.

The results of measurements on radio signals may include in each case for example an identifier of at least one transmitter transmitting the radio signals and an indication of the received signal strength of radio signals.

It is to be understood that each transmitter of the plurality of transmitters may belong to an entity that is provided exclusively for generating the static radio field at the site or that it may be part of an entity that is configured to perform further tasks.

In certain embodiments, all of the transmitters may belong to entities other than mesh nodes of the plurality of mesh nodes. They may belong for instance to Bluetooth™ beacons. This may have the effect that the mesh nodes may all be moved freely at the site. The monitoring of mesh nodes may comprise in this case for instance determining and monitoring the position of any mesh node providing measurement results.

In other embodiments, at least some of the transmitters may be a part of at least some of the plurality of mesh nodes. In this case, the transmitters may correspond to the transmitters used by the mesh nodes for transmitting messages containing measurement results, or they may be additional transmitters of the mesh nodes, for instance Bluetooth™ transmitters. This may have the effect that no separate entities are required, in case at least some of the mesh nodes are intended to monitor environmental parameters at more or less permanently fixed locations of the site anyhow. The monitoring of mesh nodes may comprise this case for instance determining and monitoring the position of any mesh node providing measurement results and/or determining changes in radio signals of other mesh nodes and to infer therefrom information on the status of these other mesh nodes.

In certain embodiments, each message comprises information constituting a message identifier. Each mesh node of the plurality of mesh nodes may forward a message, if received multiple times, only once based on the message identifier. Alternatively or in addition, the at least one gateway node may transmit a message, if received multiple times, only once to the server based on the message identifier. This may have the effect that if mesh nodes or other devices transmit or forward messages in a broadcast, only a limited number of messages has to be processed by the forwarding mesh nodes, the at least one gateway and/or the server.

A message identifier of a message containing results of measurements on radio signals transmitted by transmitters may be given for instance by a combination of a time stamp for the measurement results and an identity of the mesh node or any other device generating the message. However, a message identifier may also be provided in any different manner, as long as it can be assumed to be unique for the site at least for a short period of time. The device identity and/or a time stamp may then optionally be included in addition.

In certain embodiments, the server comprises or has access to radio map data that has been determined for radio signals transmitted by the transmitters with their current distribution at the site. The radio map data may indicate for instance for each grid point of a virtual grid covering the area of the site an expected signal strength of radio signals by each of the plurality of transmitters. Such radio map data may be assembled based on a survey at the site, which may provide particularly accurate data, or it may be determined computationally based on known locations of the transmitters and a known transmission power used by the transmitters. The availability of radio map data may enable the server to compare results of measurements performed by a mesh node or some other device and received in a message with results of measurements that may be expected at various locations of the site to determine the most likely position of the mesh node or the other device.

In certain embodiments, the server determines a position of the at least one mesh node based on a received message and stored radio map data for each of the plurality of transmitters at the site; or stored common radio map data for all of the plurality of transmitters at the site; or stored information on the current distribution of the plurality of transmitters and on a predetermined signal strength used by each of the plurality of transmitters.

In certain embodiments, the server may determine in the same manner a position of at least one device other than a mesh node based on a received message and a stored radio map data for each of the plurality of transmitters at the site; or stored common radio map data for all of the plurality of transmitters at the site; or stored information on the current distribution of the plurality of transmitters and on a predetermined signal strength used by each of the plurality of transmitters.

Figure 3:
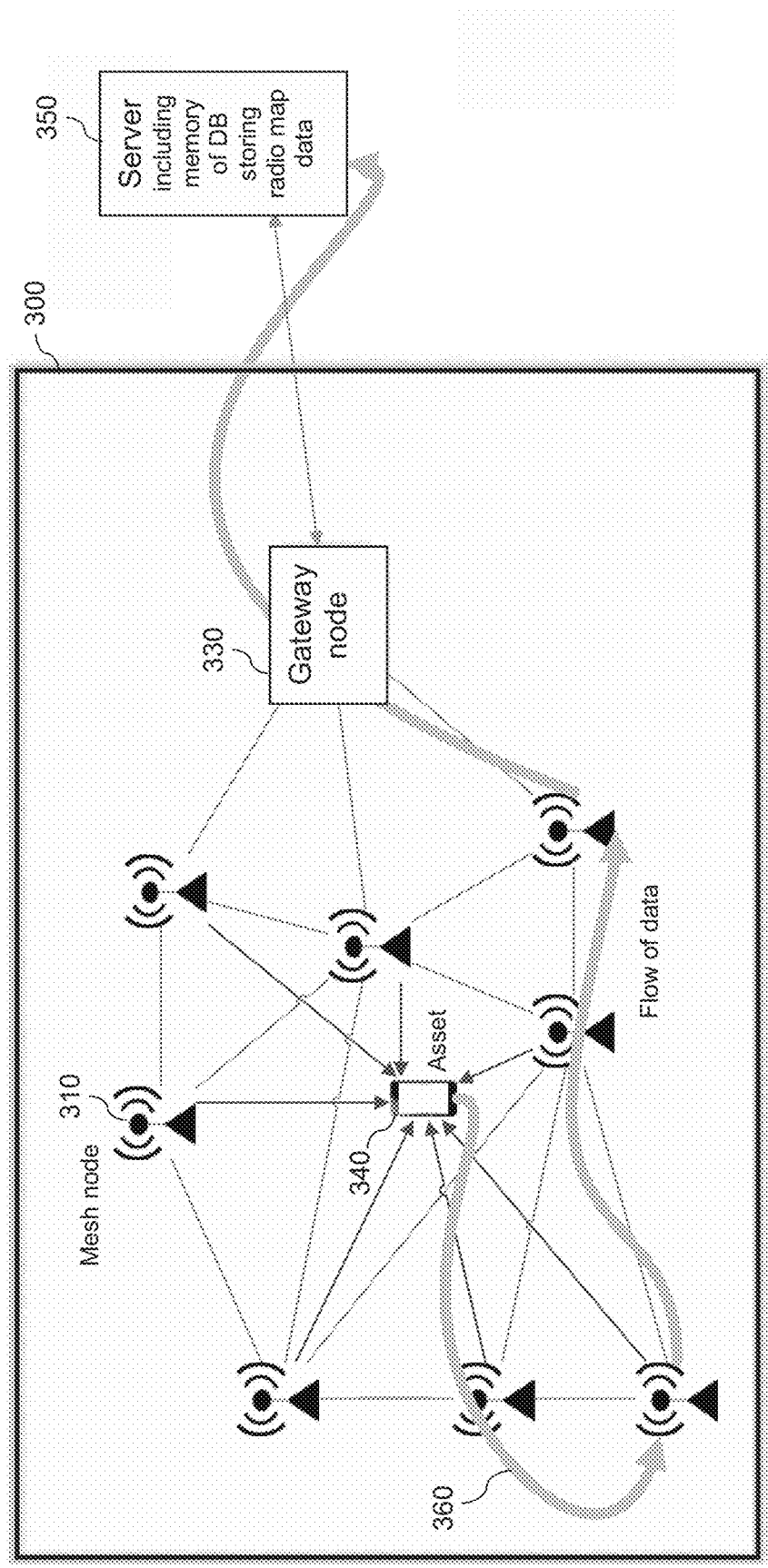
FIG. 3 is a schematic block diagram of a further example embodiment of system according to the disclosure.

FIG. 3 is a schematic block diagram of a further example embodiment of a system according to the disclosure. The system supports a monitoring of mesh nodes and in addition a tracking of assets at a site 300.

The system comprises a plurality of mesh nodes 310, a gateway node 330, an asset device 340 and a server 350 that may optionally be located outside of the site.

The mesh nodes 310 are configured to monitor at least one environmental parameter at the site, for instance temperature, humidity and/or the presence of dangerous gases. To this end, they may comprise corresponding sensors. There may be different mesh node 310 for different parameters or all mesh nodes 310 may be configured to monitor all of the parameters of interest. The mesh nodes 310 are distributed at known locations in a stationary manner, that is, they are not moved around in the factory. Each mesh node 310 comprises a transceiver configured to transmit and receive radio signals. Furthermore, each mesh node 310 comprises at least one processor and at least one memory storing computer program code. The at least one processor is configured to execute computer program code stored in the at least one memory, in order to cause mesh node 310 to perform desired actions as described further below with reference to the flow chart of FIG. 4. In this embodiment, no separate transmitters are used; rather, as the mesh nodes 310 are assumed to be stationary, they are able to provide the function of the stationary transmitters themselves. Preferably, though not necessarily, the mesh nodes 310 are distributed such that at each location of site 300, the radio signals of more than one mesh node 310 can be detected.

Gateway node 330 is configured to receive messages from the mesh nodes 310 via a radio interface and to forward messages to server 350, for example via the Internet. To this end, it comprises corresponding communication interfaces, at least one processor and at least one memory storing computer program code. The at least one processor is configured to execute computer program code stored in the at least one memory, in order to cause gateway node 330 to perform desired actions as described further below with reference to the flow chart of FIG. 4.

Server 350 may be a data aggregating analytics and positioning server. Server 350 comprises a communication interface that enables a communication with other devices, for instance via the Internet. Server 350 comprises or has access to a memory of a database storing radio map data at least for site 300. The radio map data may be mapped to a virtual grid covering the area of the site. It may provide for each grid point (or for each grid area) the identities (IDs) of mesh nodes 310, of which radio signals may be expected to be detected at a location of the site corresponding to the grid point, and an indication of the expected signal strength of the radio signals. Server 350 comprises at least one processor and at least one memory storing computer program code. The at least one processor is configured to execute computer program code stored in the at least one memory, in order to cause gateway node 330 to perform desired actions as described further below with reference to the flow chart of FIG. 4.

Asset device 340 may be a device that is meant to be attached to or integrated into a larger mobile entity, or a device that is configured to be carried by a user, e.g. in the form of a handheld device, a bracelet or a badge. Asset device 340 comprises a transceiver configured to transmit and receive radio signals. Furthermore, asset device 340 comprises at least one processor and at least one memory storing computer program code. The at least one processor is configured to execute computer program code stored in the at least one memory, in order to cause asset device 340 to perform desired actions as described further below with reference to FIG. 4.

Example operations in the system of FIG. 3 will now be described with reference to the flow chart of FIG. 4.

The transmitter part (TX) of the transceivers of all mesh nodes 310 periodically broadcast radio signals with a constant power to provide a static radio signal field, that is, a field that is not changing essentially over time. Changes may in particular be due to rearrangement of equipment at the site, etc. The radio signals convey a respective probe message which comprises an identifier (ID) for the transmitting mesh node 310. The probe message may be differentiated from other messages e.g. in that it comprise a probe indication or by using a dedicated predetermined frequency or the like. (action 410) After the deployment of the mesh nodes 310 and the activation of the periodic transmissions and before other actions presented in the following with reference to FIG. 4 are started, fingerprints may be collected throughout the site 300 as a basis for a generation of radio map data representing the static radio signal field. The radio map data may then be stored for further use in server 350.

Once radio map data has been generated and stored in server 350, all mesh nodes 310 that are to be monitored and all asset devices 340 that are to be tracked perform in parallel to the broadcasts measurements on radio signals conveying the probe messages and received by means of their transceiver or receiver. Both types of devices will also be referred to as originating devices. The measurements result in received signal strength (RSS) values. Alternatively, they could result in received signal strength indicators (RSSI). In addition, the ID of the transmitting mesh node 310 is extracted from the probe message. (action 420) The measurements may be performed for example either constantly or on a regular basis, in the latter case using a duration that exceeds the period of the periodic transmission of the probe messages in action 410. It is to be understood that the regular basis may be defined to vary over time; there could be for instance different intervals for daytime and nighttime.

The originating devices assemble a message including at least the latest measurement results for all (other) mesh nodes 310 in detection range and a message identifier (ID) in regular intervals. The message ID may be for instance in the form of a device ID and a time stamp, a computational combination thereof, or some other unique value. In the latter case, device ID and time stamp may be included in addition in the message. (action 421) It is to be understood that an originating device may add any other information that is to be conveyed to server 350 to the message. For instance, if the originating device is a mesh node 310, the originating device may periodically determine the value of one or more parameters by means of one or more sensors, and include the latest value or values in the message. If preferred, however, such parameter values could also be transmitted in separate messages.

The originating devices 310, 340 then broadcast the assembled messages. (action 422)

Equally in parallel, all mesh nodes 310 operate as forwarding mesh nodes. In this function, they receive messages including measurements that have been broadcast by nearby asset devices 340 or other mesh nodes 310. (action 430)

Some messages may reach a forwarding mesh node 310 multiple times, that is, directly from the originating device 310, 340 and/or from one or more intermediate forwarding mesh nodes 310. Therefore, each forwarding mesh node 310 extracts and evaluates the message IDs in the received messages and discards duplicate messages based on the IDs. (action 431)

The forwarding mesh nodes 310 then broadcast the respective first message for each message ID via the radio interface using its transceiver. (action 432)

Equally in parallel, gateway node 330 receives broadcast messages including measurement results via the radio interface from originating devices 310, 340 and/or from forwarding mesh nodes 310. (action 440)

Similarly as the forwarding mesh nodes 310, gateway node 330 extracts and evaluates the message IDs in the received messages and discards duplicate messages based on the contained message IDs. (action 441)

Gateway node 330 then transmits the respective first message for each message ID via the Internet specifically to server 350. (action 442)

An example path of a first message including measurement results from asset device 340 (as an example originating device) to server 350 is indicated in FIG. 3 with bold arrows 360. While the message from asset device 340 may take multiple paths via various mesh nodes 310, only the first one arriving at gateway node 330 shall be forwarded to server 350.

Server 350 receives each message including measurement results via the Internet. Each message is received only once. (action 450) In some alternative embodiments, more than one gateway node could be provided to enhance robustness of the system by providing redundancy. In this case, server 350 receives each message at the most as many times as there are gateway nodes.

Server 350 then determines a position of each originating device 310, 340. The position is determined for an originating device identified by a device ID in the message. The position is determined based on measurement results in the form of RSS values and associated mesh node IDs contained in the message and based on stored radio map data. (action 451)

Server 350 may then inform an internal or external application about a position of any asset device 340 for which a position has been determined as originating device. (action 452) The position can be used for instance for purposes of tracking, analytics, safety, etc. As asset device 340 may not have to know its location, the positioning can take place without return path to asset device 340.

In addition, server 350 may detect changes in the positions of the mesh nodes 310. The mesh nodes 310 are assumed to be stationary, and if a change in position is detected for a mesh node 310, the radio field generated with the probe messages of the mesh nodes 310 can be assumed to be disturbed. As a result, the stored radio map data representing the previous radio field may have to be updated, as otherwise the positioning of asset devices 340 may be affected adversely. Therefore, server 350 may alert a system operator if any change in position of the mesh nodes 310 is detected. (action 452) It is to be understood that alerting a system operator may not only be based on detected changes of positions of originating mesh nodes 310. For an additional or alternative approach, server 350 may store for instance in addition information indicating for each mesh node 310 which received signal strength it should measure for signals of which neighboring mesh nodes 310. If there is a significant discrepancy between an expected RSS value and a measured RSS value indicated in a message (or in case of an absence of an expected RSS value in a message), the system operator may be alerted too.

Alerting a system operator in action 452 whenever changes in the mesh node deployment are detected also ensures that potential irregularities in the monitoring of environmental parameters at site 300 are detected.

If any of the messages that are forwarded to server 350 also contain environmental parameter values, server 350 may equally be configured to evaluate these parameter values. It could alert a system operator, for instance, in case some parameter value provided by a mesh node 310 at a known position of site 300 exceeds a predetermined threshold value for this parameter in an area comprising this position.

Figure 5:
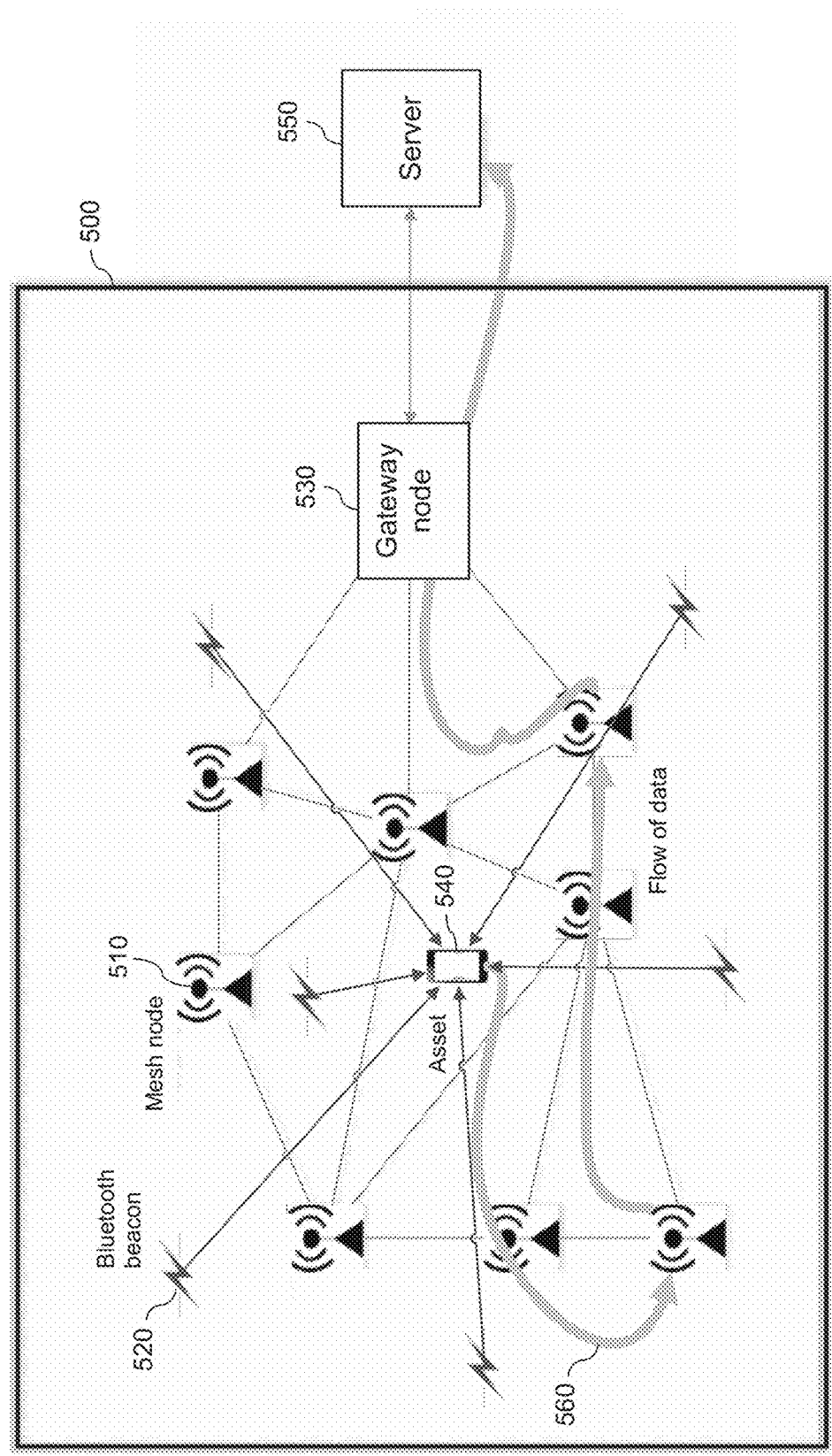
FIG. 5 is a schematic block diagram of a further example embodiment of system according to the disclosure.

FIG. 5 is a schematic block diagram of a further example embodiment of a system according to the disclosure. The system supports again a positioning of mesh nodes and assets at a site 500.

The system comprises a plurality of mesh nodes 510, a plurality of Bluetooth™ beacons 520, a gateway node 530, an asset device 540 and a server 550 that may be located outside of the site 500.

Mesh nodes 510, gateway node 530, asset device 540 and server 550 may be similar to the corresponding entities of the system of FIG. 3, except that in this embodiment, the mesh nodes 510 do not have to be confined to fixed locations.

Instead, the Bluetooth™ beacons 520 are located at fixed, known positions. Each Bluetooth™ beacon 520 comprises a transmitter configured to transmit radio signals. Preferably, though not necessarily, the Bluetooth™ beacons 520 are distributed such that at each location of site 500, the radio signals of more than one Bluetooth™ beacon 520 can be detected.

Example operations in the system of FIG. 5 will now be described with reference to the flow chart of FIG. 6.

The operations are similar to the operations in the system of FIG. 3 described with reference to the flow chart of FIG. 4, and only differences will be presented.

All Bluetooth™ beacons 520 periodically broadcast radio signals with constant power to provide a static radio signal field, that is, a field that is not changing essentially over time. The radio signals are in the form of a probe message which comprises an identifier (ID) for the transmitting Bluetooth™ beacon 520. The probe messages may be differentiated from messages of other devices 510, 540 in the system e.g. in that they comprise a probe indication or by using a dedicated predetermined frequency or the like. (action 610)

The radio signals are detected and processed by mesh nodes 510 and asset devices 540 in the same manner as described with reference to actions 420-422 of FIG. 4 to generate—as originating devices—messages with measurement results that are conveyed partly via one or more mesh nodes 510 and via gateway node 530 to server 550, as described with reference to actions 430-432 of FIG. 4. (actions 620-642)

An example path of a first message including measurement results from asset device 540 (as an example originating device) to server 550 is indicated in FIG. 5 with bold arrows 560. Server 550 receives messages including measurement results via the Internet. Each message is received only once. (action 650) If more than one gateway node is provided in a variation of the system, server 550 receives each message at the most as many times as there are gateway nodes.

Server 550 then determines a position of each originating device 510, 540. The position is determined for an originating device as identified by a device ID in the message. The position is determined for each originating device 510, 540 based on RSS values and associated Bluetooth™ beacon IDs contained in the message and based on stored radio map data. (action 651)

Server 550 may then inform internal and/or external applications about a position of any mesh node 510 and any asset device 540 for which a position has been determined as originating device. (action 652)

Figure 6:
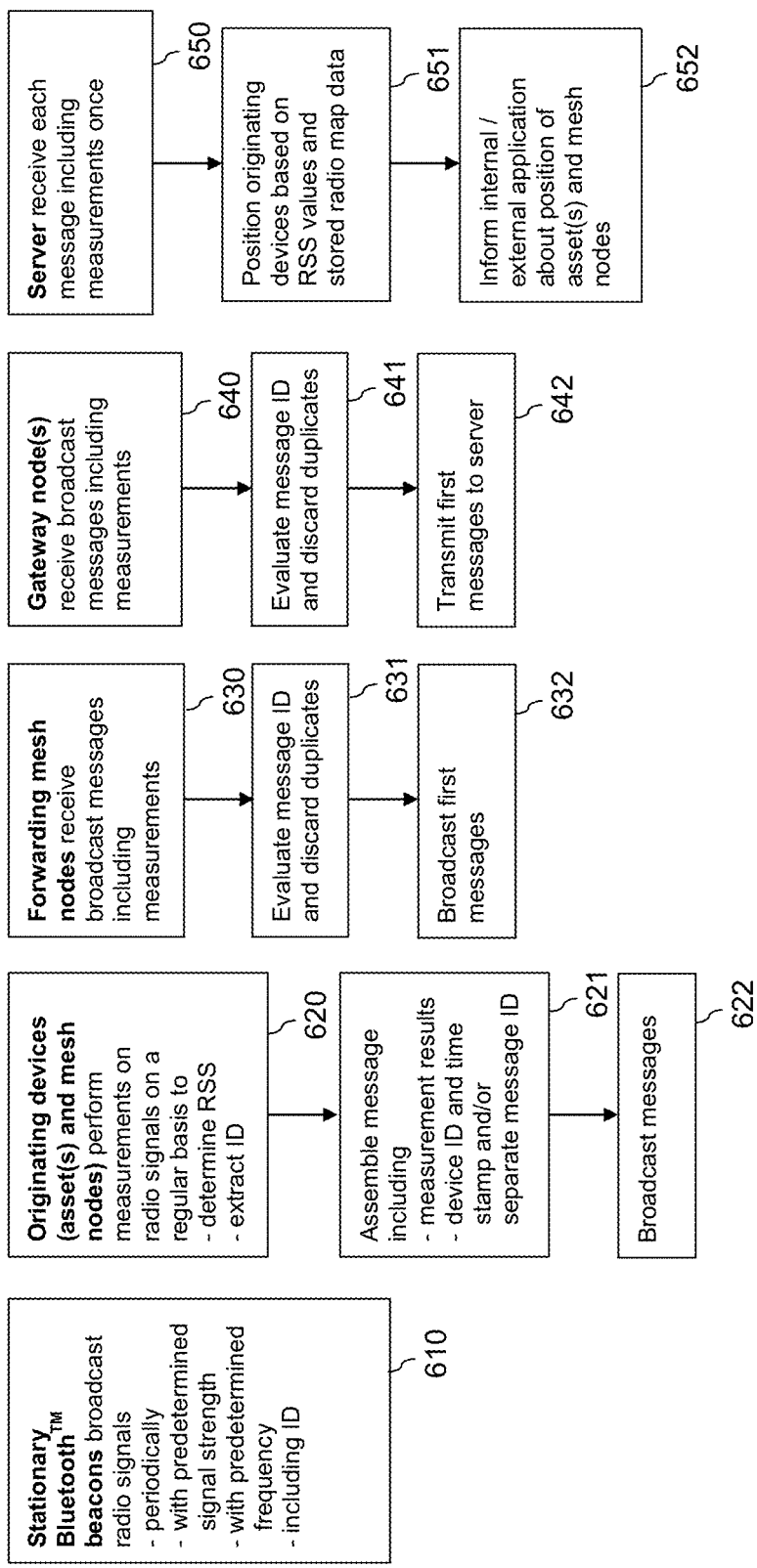
FIG. 6 is a flow chart illustrating example operations in the system of FIG. 5.

In the embodiment of FIGS. 5 and 6, changes in the distribution of the mesh nodes 510 do not have any effect on the static radio signal field. The mesh nodes 510 are only responsible for monitoring environmental parameters and for forwarding positioning related messages to gateway node 530. Thus, the mesh nodes 510 may be moved freely at the site as needed for the respective monitoring task; and as long as any mesh node can communicate with at least one other node (mesh node or gateway node), the messages can be relayed to gateway node 530.

If the messages that are forwarded to server 550 also contain environmental parameter values, server 550 may equally evaluate these parameter values. It could track the evolution of parameter values over time and/or alert a system operator, for instance, in case some parameter value provided by a mesh node 510 at a determined position of site 500 exceeds a predetermined threshold value for this parameter in an area comprising this position.

It is to be understood that the presented example systems may be varied in many ways by adding, omitting and/or modifying components; and that the presented example operations may be varied in many ways by adding, omitting and/or modifying actions and/or by changing the order of actions.

Figure 4:
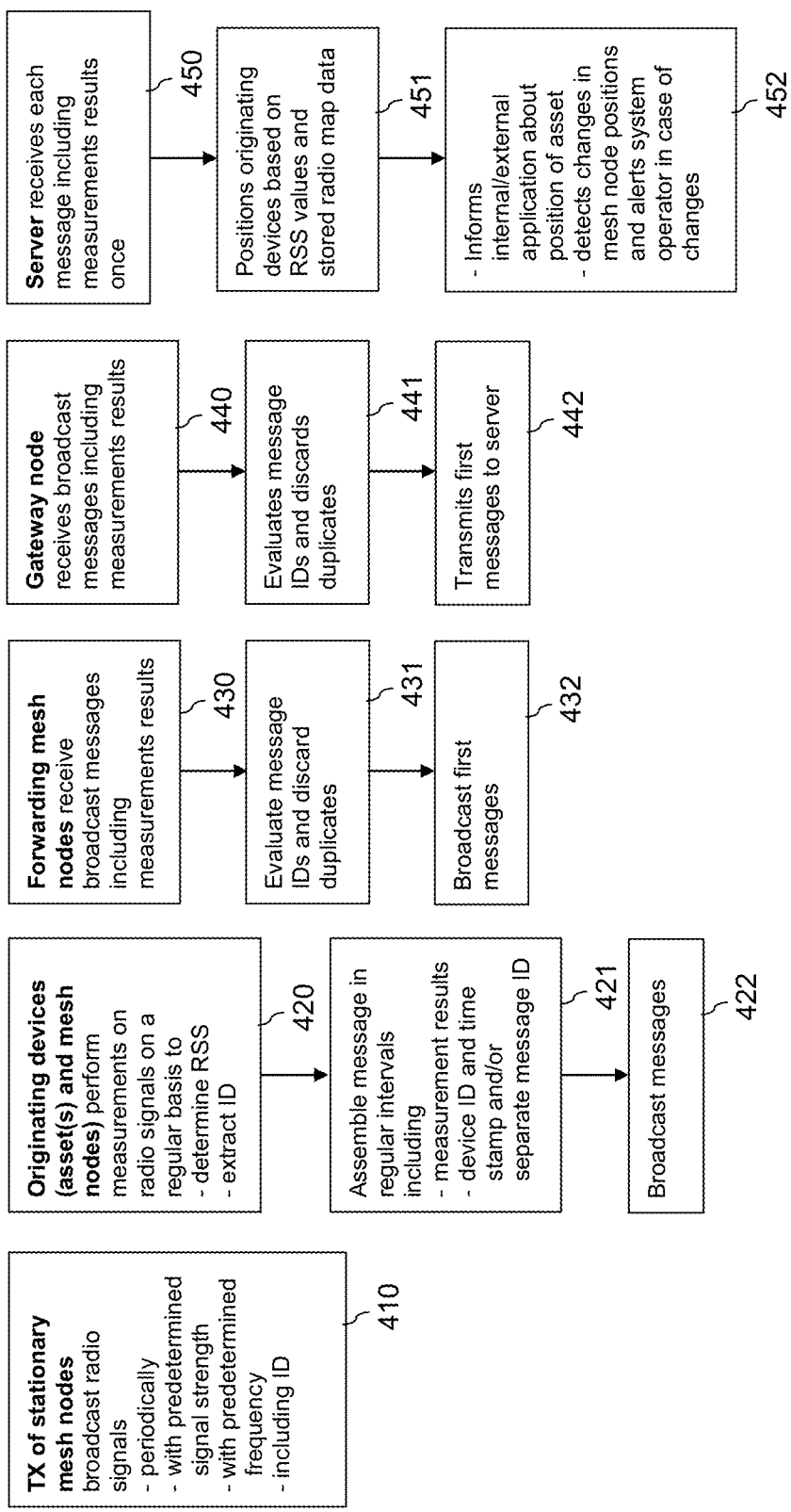
FIG. 4 is a flow chart illustrating example operations in the system of FIG. 3.

For instance, in the flow chart of FIG. 4, actions 451-452, at first only the distribution of mesh nodes 310 could be checked and possibly an alert being output to a system operator. The position of an asset device 340 may then be determined only after it has been ensured that the distribution of mesh nodes 310 is as assumed for the stored radio map data.

For instance, in the flow charts of FIGS. 4 and 6, the mesh nodes do not have to broadcast messages. Alternatively, they may transmit messages only to those mesh nodes and gateway nodes that have been detected to be in a communication range. They may also relay messages to subsequent mesh nodes more or less randomly, for instance to a certain maximum number of neighboring nodes, like two or three nodes within communication range.

For instance, in a variation of the system of FIG. 3, only some of the mesh nodes 310 may be assumed to be stationary, while the other mesh nodes 310 may be allowed to move freely at site 300. In this case, only the stationary mesh nodes 310 may be configured to broadcast probe messages on a regular basis to generate a certain radio field, while all or only the remaining mesh nodes 310 perform measurements on the radio signals and broadcast the measurement results in messages. However, also in this case, all of the mesh nodes 310 may be configured to forward received messages so that they eventually reach gateway node 330 and thus server 350.

For instance, in a variation of the system of FIG. 3 or FIG. 5, different servers may be used for different tasks, like positioning purposes and environmental parameter surveilling purposes. The gateway nodes may be configured in this case to forward messages that have been marked accordingly to the appropriate server.

Each of the presented entities of FIGS. 1, 3 and 5, including mesh nodes, asset devices, gateway nodes, servers and Bluetooth™ beacons (or other entities comprising a transmitter), may be caused to perform the indicated actions by at least one processor executing computer program code stored in at least one memory of the entity.

Figure 7:
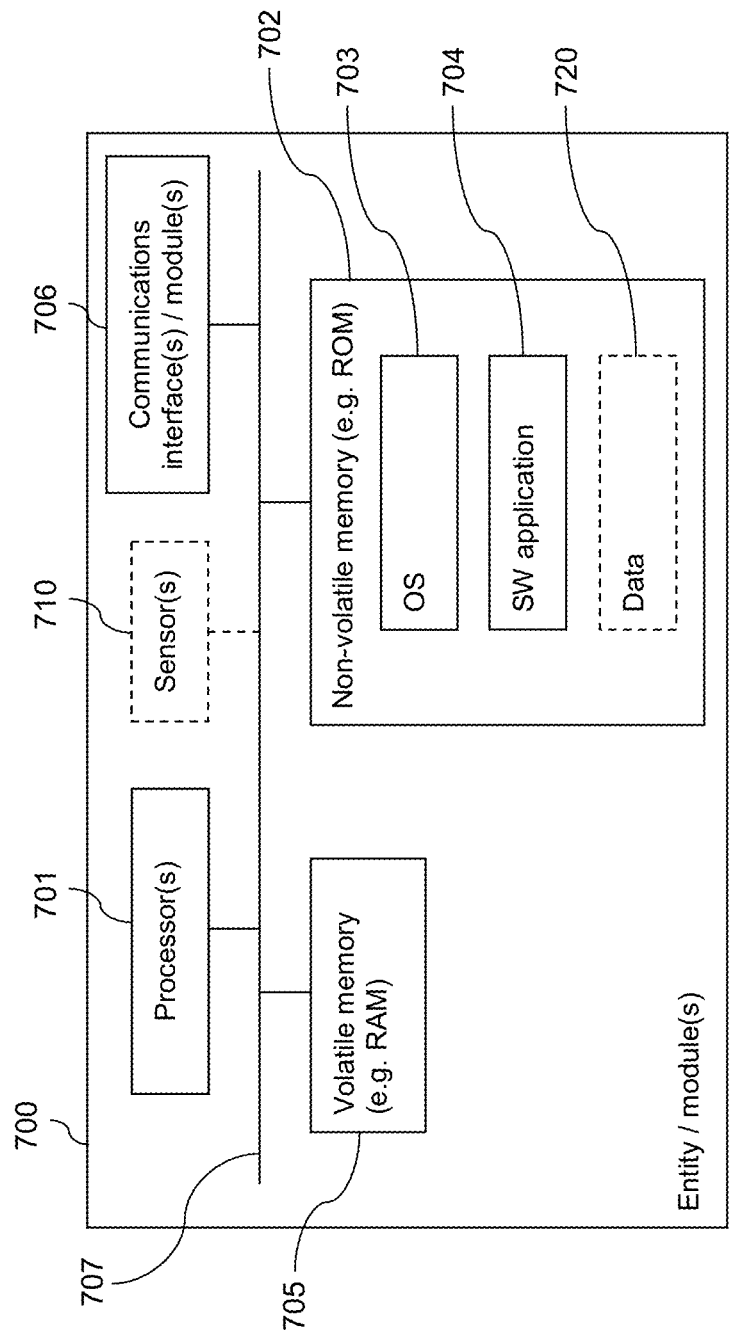
FIG. 7 is a schematic block diagram of an apparatus.

An example general structure of any such entity is presented in the block diagram of FIG. 7.

Entity 700 comprises at least one processor 701, at least one non-volatile memory 702, at least one volatile memory 705 and at least one communication interface or communication module 706.

The at least one processor 701 is linked to each of the other components; it may be enabled for instance to access each of the other components by means of a data bus 707.

The at least one non-volatile memory 702 may comprise for instance a read only memory (ROM). It may store an operating system (OS) 703 and software applications 704 including computer program code to be executed by the at least one processor 701 in order to cause entity 700 to perform desired actions.

The at least one volatile memory 705 may be for instance a random access memory (RAM). The at least one processor 701 may use volatile memory 705 as a working memory.

The at least one communication interface or communication module 706 enables all external communications required for the operation of the concerned entity. For instance, if entity 700 is a Bluetooth™ beacon, the at least one communication interface or communication module 706 comprises at least a Bluetooth™ transmitter. For instance, if entity 700 is a mesh node, the at least one communication interface or communication module 706 comprises a transceiver that is configured to receive signals from other mesh nodes and from asset devices, and that is configured to transmit signals to other mesh nodes and to a gateway node. For instance, if entity 700 is an asset device, the at least one communication interface or communication module 706 comprises a transceiver that is configured to enable a communication with mesh nodes and optionally with a gateway node. If the system makes use of Bluetooth™ beacons for generating the static radio signal field, the at least one communication interface or communication module 706 of asset devices and mesh nodes comprise in addition a Bluetooth™ transceiver or at least a Bluetooth™ receiver. For instance, if entity 700 is a gateway node, the at least one communication interface or communication module 706 comprises a receiver or transceiver that is configured to enable receipt of radio signals from mesh nodes and optionally from asset devices. In addition, it comprises an interface 706 enabling access to a server, for instance a TCP/IP socket enabling an access to a server via the Internet. For instance, if entity 700 is a server, it comprises an interface 706 enabling a communication with a gateway node, for instance a TCP/IP socket enabling an access via the Internet. In addition, it may comprise a data interface 706 for accessing an external database storing radio map data or other required information in a memory. The radio signal based communication between asset devices, mesh nodes and gateway node may take place for instance according to standard IEEE 802.15.4 or according to any proprietary communication protocol.

If entity 700 is a mesh node, it may comprise in addition at least one sensor 710, for instance a temperature sensor, a humidity sensor or a gas sensor.

If entity 700 is a server, the at least one memory 702 may store in addition radio map data 720 or other data. In general, the at least one memory 702 may store any data that may be needed by an entity 700.

Entity 700 could comprise various other components, like a battery and/or a mains connection, a user interface, etc. Processor(s) 701 and memories 702 and 705 may optionally belong to a chip or a circuitry, like an integrated circuit, which may comprise in addition various other components, for instance a further processor or memory.

In an example embodiment, entity or module 700 of FIG. 7 may represent an apparatus comprising at least one processor 701 and at least one memory 702 storing computer program code 703, wherein the at least one memory 702 and the computer program code 703, with the at least one processor 701, configured to cause a mesh node to: monitor at least one environmental parameter; perform measurements on radio signals transmitted by at least one transmitter, the least one transmitter being at least one of a plurality of transmitters distributed at fixed locations at a site and transmitting radio signals in regular intervals; transmit messages including results of the measurements; and receive and forward messages including results of measurements at other mesh nodes. The apparatus may be the mesh node or at least one component of the mesh node, like a chip or chipset or any other kind of circuitry, FIGS. 2, 4 and 6 may also be understood to represent exemplary functional blocks of a computer program code for supporting a surveillance of a site.

Summarized, certain embodiments of the disclosure may enable the use of mesh nodes for a plurality of different tasks. They may be used for monitoring one or more environmental parameter values at a site. They may be used for forming a communication network that is suited for forwarding results of the monitoring at any location of the site to a gateway node and thus to a server. The network of mesh nodes may furthermore be used for supporting a positioning of separate asset devices by forwarding messages of such asset devices via the gateway node to the server. And finally, the network of mesh nodes may be used for supporting a surveillance of the distribution of the mesh nodes themselves by forwarding messages containing results of measurement on radio signals performed at mesh nodes via the gateway node to the server. Using the mesh network concept may have the effect that there is no need to deploy any other connectivity mechanisms, such as WLAN or cellular, at the site for conveying the measurement results to a server. The mesh network may also be particularly robust, because there may be no single point of failure when assuming that each node (mesh node or gateway node) sees more than one other node. Both, asset devices and mesh nodes may be positioned with an accuracy of 2-3 meters and with coverage of basically 100%.

The following embodiments of the disclosure are also disclosed:

Embodiment 1

A method comprising:
each of a plurality of transmitters, which are distributed at fixed locations of a site, transmitting radio signals in regular intervals;
at least one mesh node performing measurements on radio signals transmitted by at least one transmitter of the plurality of transmitters and transmitting messages including results of the measurements, wherein the at least one mesh node belongs to a plurality of mesh nodes, with each of the plurality of mesh nodes configured to monitor at least one environmental parameter at the site;
at least one gateway node receiving messages transmitted by the at least one mesh node directly and/or via at least one other mesh node of the plurality of mesh nodes, wherein each of the plurality of mesh nodes is configured to receive messages from other mesh nodes of the plurality of mesh nodes and to forward received messages; and
the at least one gateway node transmitting received messages of the at least one mesh node to a server that is configured to monitor mesh nodes at the site based on results of measurements in received messages.

Embodiment 2

The method according to embodiment 1, further comprising:
at least one device performing measurements on radio signals transmitted by at least one transmitter and broadcasting a message including results of the measurements, wherein the at least one device does not belong to the plurality of mesh nodes;
at least one mesh node of the plurality of mesh nodes receiving the message broadcast by the at least one device and forwarding the received message, wherein each of the plurality of mesh nodes is configured to receive messages broadcast by the at least one device and to forward received messages of the at least one device;
at least one gateway node receiving the message broadcast by the at least one device via at least one mesh node of the plurality of mesh nodes; and the at least one gateway node transmitting the message broadcast by the at least one device to a positioning server that is configured to determine a position of the at least one device at the site.

Embodiment 3

The method according to embodiment 1 or 2, wherein the transmitters
belong to entities other than mesh nodes of the plurality of mesh nodes; and/or
belong to Bluetooth™ beacons.

Embodiment 4

The method according to embodiment 1 or 2, wherein at least some of the transmitters are a part of at least some of the plurality of mesh nodes.

Embodiment 5

The method according to any of embodiments 1 to 4,
wherein each message comprises information constituting a message identifier; and
wherein each mesh node of the plurality of mesh nodes forwards a message, if received multiple times, only once based on the message identifier.

Embodiment 6

The method according to any of embodiments 1 to 5,
wherein each message comprises information constituting a message identifier; and
wherein the at least one gateway node transmits a message, if received multiple times, only once to the server based on the message identifier.

Embodiment 7

The method according to any of embodiments 1 to 6, wherein the server comprises or has access to radio map data that has been determined for radio signals transmitted by the transmitters with their current distribution at the site.

Embodiment 8

The method according to any of embodiments 1 to 7, further comprising the server determining a position of the at least one mesh node based on a received message and
stored radio map data for each of the plurality of transmitters at the site; or
stored common radio map data for all of the plurality of transmitters at the site; or
stored information on the current distribution of the plurality of transmitters and on a predetermined signal strength used by each of the plurality of transmitters.

Embodiment 9

The method according to embodiment 2 or any of embodiments 3 to 8 as far as referring back to embodiment 2, further comprising the server determining a position of the at least one device based on a received message and
stored radio map data for each of the plurality of transmitters at the site; or
stored common radio map data for all of the plurality of transmitters at the site; or
stored information on the current distribution of the plurality of transmitters and on a predetermined signal strength used by each of the plurality of transmitters.

Embodiment 10

A system comprising:
a plurality of transmitters distributed at fixed locations of a site, each configured to transmit radio signals in regular intervals;
a plurality of mesh nodes, each of the plurality of mesh nodes configured to monitor at least one environmental parameter at the site, each of the plurality of mesh nodes configured to receive messages from other mesh nodes of the plurality of mesh nodes and to forward received messages, and at least one of the plurality of mesh nodes configured to perform measurements on radio signals transmitted by at least one transmitter of the plurality of transmitters and to transmit messages including results of the measurements; and
at least one gateway node configured to receive messages transmitted by the at least one mesh node directly and/or via at least one other mesh node of the plurality of mesh nodes and configured to transmit received messages of the at least one mesh node to a server that is configured to monitor mesh nodes at the site based on results of measurements in received messages.

Embodiment 11

The system according to embodiment 10,
wherein each of the plurality of mesh nodes is further configured to receive messages broadcast by at least one device that does not belong to the plurality of mesh nodes and to forward received messages of the at least one device, wherein the messages include results of measurements performed by the at least one device on radio signals transmitted by at least one transmitter; and
wherein the at least one gateway node is further configured to receive the messages broadcast by the at least one device via at least one mesh node of the plurality of mesh nodes and to transmit the messages broadcast by the at least one device to a positioning server that is configured to determine a position of the at least one device at the site.

Embodiment 12

The system according to embodiment 10 or 11, wherein the transmitters
belong to entities other than mesh nodes of the plurality of mesh nodes; and/or
belong to Bluetooth™ beacons.

Embodiment 13

The system according to embodiment 10 or 11, wherein at least some of the transmitters are a part of at least some of the plurality of mesh nodes.

Embodiment 14

The system according to any of embodiments 10 to 13, wherein each message comprises information constituting a message identifier; and
wherein each mesh node of the plurality of mesh nodes is configured to forward a message, if received multiple times, only once based on the message identifier.

Embodiment 15

The system according to any of embodiments 10 to 14, wherein each message comprises information constituting a message identifier; and
wherein the at least one gateway node is configured to transmit a message, if received multiple times, only once to the server based on the message identifier.

Embodiment 16

The system according to any of embodiments 10 to 15, further comprising the server, wherein the server comprises or has access to radio map data that has been determined for radio signals transmitted by the transmitters with their current distribution at the site.

Embodiment 17

The system according to any of embodiments 10 to 16, further comprising the server, wherein the server is configured to determine a position of the at least one mesh node based on a received message and
stored radio map data for each of the plurality of transmitters at the site; or
stored common radio map data for all of the plurality of transmitters at the site; or
stored information on the current distribution of the plurality of transmitters and on a predetermined signal strength used by each of the plurality of transmitters.

Embodiment 18

The system according to embodiment 11 or any of embodiments 12 to 17 as far as referring back to embodiment 11, further comprising the server, wherein the server is configured to determine a position of the at least one device based on a received message and
stored radio map data for each of the plurality of transmitters at the site; or
stored common radio map data for all of the plurality of transmitters at the site; or
stored information on the current distribution of the plurality of transmitters and on a predetermined signal strength used by each of the plurality of transmitters.

Embodiment 19

An apparatus comprising at least one processor and at least one memory storing computer program code, wherein the memory and the computer program code, with the processor, configured to cause a mesh node to:
monitor at least one environmental parameter;
perform measurements on radio signals transmitted by at least one transmitter, the least one transmitter being at least one of a plurality of transmitters distributed at fixed locations at a site and transmitting radio signals in regular intervals;
transmit messages including results of the measurements; and
receive and forward messages including results of measurements at other mesh nodes.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present.

This definition of circuitry applies to all uses of this term in this application, including in any claims. As a further example, as used in this application, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile phone or a similar integrated circuit in server, a cellular network device, or other network device.

Any of the processors mentioned in this text could be a processor of any suitable type. Any processor and memory may comprise but is not limited to one or more single-core processor(s), one or more dual-core processor(s), one or more multi-core processor(s), one or more microprocessor(s), one or more digital signal processor(s), one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

What is claimed is:

1. A method comprising:
   each of a plurality of transmitters, which are distributed at fixed locations of a site, transmitting radio signals in regular intervals;
   at least one mesh node performing measurements on radio signals transmitted by at least one transmitter of the plurality of transmitters and transmitting messages including results of the measurements, wherein the at least one mesh node belongs to a plurality of mesh nodes, with each of the plurality of mesh nodes configured to monitor at least one environmental parameter at the site;
   at least one gateway node receiving the messages transmitted by the at least one mesh node directly and/or via at least one other mesh node of the plurality of mesh nodes, wherein each of the plurality of mesh nodes is configured to receive messages from other mesh nodes of the plurality of mesh nodes and to forward the received messages; and
   the at least one gateway node transmitting the received messages from the at least one mesh node to a server that is configured to monitor the mesh nodes at the site based on results of the measurements in the received messages,
   wherein at least one device performs measurements on radio signals transmitted by at least one transmitter and broadcasts a message including results of the measurements, wherein the at least one device in not included in the plurality of mesh nodes;
   wherein the at least one mesh node of the plurality of mesh nodes receives the message broadcast by the at least one device and forwards the received message, wherein each of the plurality of mesh nodes is configured to receive messages broadcast by the at least one device and to forward received messages of the at least one device;
   wherein the at least one gateway node receives the message broadcast by the at least one device via the at least one mesh node of the plurality of mesh nodes; and
   wherein the at least one gateway node transmits the message broadcast by the at least one device to the server that is configured to determine a position of the at least one device at the site.

2. The method according to claim 1, wherein the transmitters belong to entities other than mesh nodes of the plurality of mesh nodes; and/or belong to Bluetooth™ beacons.

3. The method according to claim 1, wherein at least some of the transmitters are a part of at least some of the plurality of mesh nodes.

4. The method according to claim 1,
   wherein each message comprises information constituting a message identifier; and
   wherein each mesh node of the plurality of mesh nodes forwards a message, if received multiple times, only once based on the message identifier.

5. The method according to claim 1,
   wherein each message comprises information constituting a message identifier; and
   wherein the at least one gateway node transmits a message, if received multiple times, only once to the server based on the message identifier.

6. The method according to claim 1, wherein the server comprises or has access to radio map data that has been determined for radio signals transmitted by the transmitters with their current distribution at the site.

7. The method according to claim 1, further comprising the server determining a position of the at least one mesh node based on a received message and
   stored radio map data for each of the plurality of transmitters at the site; or
   stored common radio map data for all of the plurality of transmitters at the site; or
   stored information on the current distribution of the plurality of transmitters and on a predetermined signal strength used by each of the plurality of transmitters.

8. The method according to claim 2, further comprising the server determining a position of the at least one device based on a received message and
   stored radio map data for each of the plurality of transmitters at the site; or
   stored common radio map data for all of the plurality of transmitters at the site; or
   stored information on the current distribution of the plurality of transmitters and on a predetermined signal strength used by each of the plurality of transmitters.

9. A system comprising:
   a plurality of transmitters distributed at fixed locations of a site, each configured to transmit radio signals in regular intervals;
   a plurality of mesh nodes, each of the plurality of mesh nodes configured to monitor at least one environmental parameter at the site, each of the plurality of mesh nodes configured to receive messages from other mesh nodes of the plurality of mesh nodes and to forward the received messages, and a first mesh node of the plurality of mesh nodes configured to perform measurements on radio signals transmitted by at least one transmitter of the plurality of transmitters and to transmit messages including results of the measurements; and
   at least one gateway node configured to receive the messages transmitted by the first mesh node directly and/or via a second mesh node of the plurality of mesh nodes and configured to transmit the received messages of the first mesh node to a server that is configured to monitor mesh nodes at the site based on results of measurements in the received messages,
   wherein each of the plurality of mesh nodes is further configured to receive messages broadcast by at least one device that included in the plurality of mesh nodes and to forward received messages of the at least one device, wherein the messages include results of measurements performed by the at least one device on radio signals transmitted by at least one transmitter; and
   wherein the at least one gateway node is further configured to receive the messages broadcast by the at least one device via at least one mesh node of the plurality of mesh nodes and to transmit the messages broadcast by the at least one device to the server that is configured to determine a position of the at least one device at the site.

10. The system according to claim 9, wherein the transmitters belong to entities other than mesh nodes of the plurality of mesh nodes; and/or belong to Bluetooth™ beacons.

11. The system according to claim 9, wherein at least some of the transmitters are a part of at least some of the plurality of mesh nodes.

12. The system according to claim 9, wherein each message comprises information constituting a message identifier; and wherein each mesh node of the plurality of mesh nodes is configured to forward a message, if received multiple times, only once based on the message identifier.

13. The system according to claim 9, wherein each message comprises information constituting a message identifier; and wherein the at least one gateway node is configured to transmit a message, if received multiple times, only once to the server based on the message identifier.

14. The system according to claim 9, further comprising the server, wherein the server comprises or has access to radio map data that has been determined for radio signals transmitted by the transmitters with their current distribution at the site.

15. The system according to claim 9, further comprising the server, wherein the server is configured to determine a position of the at least one mesh node based on a received message and
- stored radio map data for each of the plurality of transmitters at the site; or
- stored common radio map data for all of the plurality of transmitters at the site; or
- stored information on the current distribution of the plurality of transmitters and on a predetermined signal strength used by each of the plurality of transmitters.

16. The system according to claim 9, further comprising the server, wherein the server is configured to determine a position of the at least one device based on a received message and
- stored radio map data for each of the plurality of transmitters at the site; or
- stored common radio map data for all of the plurality of transmitters at the site; or
- stored information on the current distribution of the plurality of transmitters and on a predetermined signal strength used by each of the plurality of transmitters.

17. An apparatus comprising at least one processor and at least one memory storing computer program code, wherein the memory and the computer program code, with the processor, configured to cause a mesh node to:
- monitor at least one environmental parameter;
- perform measurements on radio signals transmitted by at least one transmitter, the least one transmitter being at least one of a plurality of transmitters distributed at fixed locations at a site and transmitting radio signals in regular intervals;
- transmit messages including results of the measurements; and
- receive and forward messages including results of measurements at other mesh nodes for the at least one environment parameter and including measurements on radio signals made by at least one device different from the mesh node.

* * * * *